(12) United States Patent  
Kokjohn et al.

(10) Patent No.: US 10,794,340 B2  
(45) Date of Patent: Oct. 6, 2020

(54) ENGINES USING SUPERCRITICAL SYNGAS

(71) Applicant: Wisconsin Alumni Research Foundation, Madison, WI (US)

(72) Inventors: Sage Kokjohn, Oregon, WI (US); David Wickman, Madison, WI (US); Flavio Dal Forno Chuahy, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 37 days.

(21) Appl. No.: 15/960,735

(22) Filed: Apr. 24, 2018

(65) Prior Publication Data

US 2019/0323459 A1 Oct. 24, 2019

(51) Int. Cl.
*F02M 31/08* (2006.01)
*F02B 17/00* (2006.01)
(Continued)

(52) U.S. Cl.
CPC .......... *F02M 31/08* (2013.01); *F02B 17/005* (2013.01); *F02B 45/00* (2013.01); *F02B 51/00* (2013.01);
(Continued)

(58) Field of Classification Search
CPC .... F02B 17/00; F02B 17/005; F02B 2201/06; F02M 21/02; F02M 21/0203;
(Continued)

(56) References Cited

U.S. PATENT DOCUMENTS 6,010,544 A * 1/2000 Haldeman ............... C10L 1/328  
44/301  
6,170,441 B1 * 1/2001 Haldeman ............... F02B 41/04  
123/25 D  
(Continued)

FOREIGN PATENT DOCUMENTS

CA         868821 A  *  4/1971
EP      0790395 A2  *  8/1997  ............... F02B 1/00
(Continued)

OTHER PUBLICATIONS

Rahnama, P.; Paykani,A.; Bordbar, V.; Reitz, R.D. A numerical study of the effects of reformer gas composition on the combustion and emission characteristics of a natural gas/diesel RCCI engine enriched with reformer gas. Fuel 2017, 209, 742-753. (Year: 2017).*
(Continued)

*Primary Examiner* — Jacob M Amick
*Assistant Examiner* — Michael A Kessler
(74) *Attorney, Agent, or Firm* — Craig A. Fieschko, Esq.; DeWitt LLP

(57) ABSTRACT

A first engine fuel, for example diesel fuel, is reformed (preferably via steam reforming) to produce syngas for use as a second engine fuel, with the fuels then both being used in an internal combustion engine to perform Reactivity Controlled Compression Ignition (RCCI). The syngas is produced and supplied to the engine as a supercritical fluid, thereby avoiding the pumping losses that would occur if syngas was pressurized for supply/injection. The reforming is done by a reformer which is provided as a unit with the engine (e.g., both the engine and reformer are onboard a vehicle), thereby effectively allowing use of a single fuel for RCCI engine operation.

20 Claims, 2 Drawing Sheets

(51) Int. Cl.
*F02B 45/00* (2006.01)
*F02D 19/06* (2006.01)
*F02D 41/00* (2006.01)
*F02B 51/00* (2006.01)

(52) U.S. Cl.
CPC ..... *F02D 19/0649* (2013.01); *F02D 41/0025* (2013.01); *F02B 2201/06* (2013.01); *F02B 2275/14* (2013.01)

(58) Field of Classification Search
CPC .......... F02M 21/0206; F02M 21/0209; F02M 21/0212; F02M 21/0227; F02M 21/0215; F02M 27/042; F02D 19/00; F02D 19/02; F02D 19/021; F02D 19/022; F02D 19/04; F02D 19/06; F02D 19/0602; F02D 19/0605; F02D 19/0639; F02D 19/0642; F02D 19/0647; F02D 19/0649; F02D 19/0652; F02D 19/08; F02D 19/081; F02D 19/10; F02D 19/105; F02D 41/0025; F02D 41/0027; F02D 41/3023; F02D 2041/3052; Y02T 10/121
USPC ........................................................ 123/295
See application file for complete search history.

(56) References Cited

U.S. PATENT DOCUMENTS

| | | | | |
|---|---|---|---|---|
| 6,213,104 B1* | 4/2001 | Ishikiriyama | ........... | F02B 51/00 123/27 GE |
| 6,899,859 B1* | 5/2005 | Olsvik | ..................... | C01B 3/34 423/437.1 |
| 8,616,177 B2* | 12/2013 | Reitz | ................... | F02B 23/0669 123/304 |
| 9,926,837 B2* | 3/2018 | Gruber | ..................... | C10K 1/04 |
| 2006/0107586 A1* | 5/2006 | Tavlarides | .............. | C10L 1/026 44/628 |
| 2008/0000445 A1* | 1/2008 | Kim | .................... | F02D 41/0025 123/295 |
| 2014/0109866 A1* | 4/2014 | Gruber | ............... | F02M 21/0215 123/262 |
| 2014/0251278 A1* | 9/2014 | de Boer | .............. | F02D 41/3047 123/472 |
| 2016/0265416 A1* | 9/2016 | Ge | ......................... | F02B 19/10 |

FOREIGN PATENT DOCUMENTS

| | | |
|---|---|---|
| JP | 6262268 B2 | 1/2018 |
| WO | WO 2008/106722 A1 | 9/2008 |
| WO | WO-2008106722 A1 * | 9/2008 ............. F02B 19/10 |

OTHER PUBLICATIONS

Rahnama, P.; Paykani, A.; Reitz, R.D. A numerical study of the effects of using hydrogen, reformer gas and nitrogen on combustion, Reference Delivery Request emissions and load limits of a heavy duty natural gas/diesel RCCI engine. Appl. Energy 2017, 193, 182-198. (Year: 2017).*

Azimov et al., Combustion Characteristics of Syngas and Natural Gas in Micro-pilot Ignited Dual-fuel Engine, *World Academy of Science, Engineering and Technology International Journal of Mechanical and Mechatronics Engineering*, 2012, vol. 6, No. 12:2863-2870.

Barendregt et al., Development of a supercritical Diesel Reformer in a Hybrid Fuel Cell System, Defense Material Organization, Sep. 2003-Oct. 2010.

Boukis, et al., Methanol Reforming in Supercritical Water, *Ind. Eng. Chem. Res.*, 2003, 42:728-735.

Chuahy, F.D.F. and Kokjohn, S.L., "High Efficiency Dual-Fuel Combustion through Thermochemical Recovery and Diesel Reforming", *Applied Energy*, 2017 https://doi.org/10.1016/j.apenergy.2017.03.078.

Hagos et al., Trends of Syngas as a Fuel in Internal Combustion Engines, *Advances in Mechanical Engineering*, 2014, vol. 2014, Article ID 401587, pp. 1-10.

Mahgoub et al., Performance Study of Imitated Syngas in a Dual Fuel Compression Ignition Diesel Engine, *International Journal of Automotive and Mechanical Engineered (IJAME)*, 2015, vol. 11, pp. 2282-2293 (ISSN: 2229-8649 (Print); ISSN: 2180-1606 (Online) DOI: http://dx.doi.org/10.15282/ijame.11.2015.11.0192.

Picou, Jason W., Autothermal non-catalytic reformation of jet fuel in a supercritical water medium, (2008), *Masters Thesis*, Paper 4675.

Sahoo et al., Abstract—Effect of $H_2O:CO$ ratio in syngas on the performance of a dual fuel diesel engine operation, *Applied Thermal Engineering*, 2012, vol. 49, pp. 139-146.

Wagemakers et al., Review on the Effects of Dual-Fuel Operation, Using Diesel and Gaseous Fuels, On Emissions and Performance, *SAE International Journal of Engines*, 2012, DOI: 10.4271/2012-01-0859.

PCT International Search Report, PCT/US2019/014764, dated Jan. 3, 2020.

PCT Written Opinion, PCT/US2019/014764. dated Jan. 3, 2020.

* cited by examiner

ENGINES USING SUPERCRITICAL SYNGAS

STATEMENT REGARDING FEDERALLY SPONSORED RESEARCH

This invention was made with government support under N00014-14-1-0695 awarded by the NAVY/ONR. The government has certain rights in the invention.

FIELD OF THE INVENTION

This document concerns an invention relating generally to combustion methods for internal combustion engines operating on reformed fuel, and more specifically to reactivity controlled compression ignition (RCCI) combustion utilizing synthesis gas as a fuel.

BACKGROUND OF THE INVENTION

Reactivity controlled compression ignition (RCCI), a promising combustion method for internal combustion engines, can provide high efficiency with near zero nitrous oxide (NOx) and soot emissions. See, for example, U.S. Pat. Nos. 8,616,177, 8,851,045, 9,057,321, 9,080,501, and 9,376,955. However, a drawback of RCCI is that it requires at least two fuels of different reactivity, for example, diesel fuel and gasoline. RCCI engines therefore typically require at least two fuel reservoirs (or at least one fuel reservoir, and at least one reservoir for a reactivity-altering fuel additive). This need for two reservoirs, and more particularly for two fuels, has been an obstacle to widespread use of RCCI technology.

Synthesis gas ("syngas"), a gas mixture which primarily contains hydrogen (H2) and carbon monoxide (CO), is useful in many applications, including use as a combustible fuel, and/or as raw material for production of plastics, other fuels, fertilizers, pesticides, and other materials. Syngas can be produced from hydrocarbons (including coal, natural gas, biomass, etc.) via a process known as "reforming." Many different reforming techniques are known, with perhaps the most common being steam reformation. In steam reformation, a hydrocarbon feedstock is reacted with steam in a "reformer," in the presence of a catalyst, to generate syngas.

The inventors contemplated installation of a reformer within a vehicle having an RCCI engine, or otherwise providing a reformer in close proximity to an RCCI engine, such that a hydrocarbon fuel (e.g., diesel fuel) could be used as one of the RCCI fuels, and syngas could be produced for use as the second RCCI fuel by reforming a portion of the hydrocarbon fuel. While results were promising, premature auto-ignition often occurred when the syngas was premixed in the intake stream (e.g., supplying it to the intake manifold, or otherwise supplying it upstream from the intake port), leading to severe losses in engine efficiency. To remedy the auto-ignition, the inventors contemplated direct injection of syngas at high pressure near top dead center. However, this requires compressing the gas-phase syngas to the high pressures needed for direct injection (typically above 200 bar), and such compression requires a substantial portion of the engine's output power.

SUMMARY OF THE INVENTION

The invention, which is defined by the claims set forth at the end of this document, involves reforming a first RCCI engine fuel, for example diesel fuel, to produce syngas for use as a second RCCI engine fuel, with the reformation taking place in close proximity to the engine (e.g., both the engine and reformer are onboard a vehicle), thereby effectively allowing use of a single fuel for RCCI engine operation. Another aspect of the invention relates to reforming the first RCCI engine fuel at high pressure to generate syngas in a supercritical fluid state. (A supercritical fluid results when a substance is at a pressure and temperature above its critical point, where distinct liquid and gas phases do not exist: it can effuse through solids like a gas, and dissolve materials like a liquid.) Reforming is performed on the pressurized first fuel to generate syngas above its critical pressure, resulting in a supercritical mixture of H2 and CO. Considering diesel fuel as an exemplary first fuel, the syngas mixture can be injected early in the combustion cycle to create a premixed charge, with the diesel fuel being injected later in the cycle to produce a stratified charge for RCCI. Reforming at supercritical conditions alleviates the need to pressurize gaseous syngas, and avoids the losses arising therefrom.

To briefly summarize exemplary versions of the invention, supercritical syngas is produced from hydrocarbons via reforming, and is supplied to a combustion chamber of an internal combustion engine while in the supercritical state, preferably via direct injection into the combustion chamber. If desired, the engine can be operated using syngas alone, including operation at a stoichiometric air/fuel ratio. As is well known, diesel (compression ignition) engines run at a lean air-to-fuel ratio (with more air than necessary to fully react with the fuel), rather than at a stoichiometric air-to-fuel ratio (with just the right amount of air to fully react with the supplied fuel), because stoichiometric operation tends to result in high unburned hydrocarbon (soot) formation. A benefit of the invention is that syngas does not form soot, thereby allowing stoichiometric operation without the need for expensive exhaust after-treatment measures. However, it is particularly preferred that the supercritical syngas and hydrocarbons both be used for RCCI operation of the engine, such that both the syngas and the hydrocarbons are concurrently present in the combustion chamber as a stratified mixture prior to ignition (with regions of higher hydrocarbon concentration are spaced from regions of higher syngas concentration). As an example, the syngas may be produced from a portion of a diesel fuel supply and may be directly injected into the combustion chamber sufficiently prior to top dead center to achieve a high degree of premixed homogeneity within the chamber, and the diesel fuel may then be directly injected into the chamber closer to top dead center to generate the stratified mixture.

Preferably, all of the fuel reservoir containing the hydrocarbons, the reformer for producing the supercritical syngas from the hydrocarbons, and the engine are provided as a unit, that is, they are all onboard a vehicle or are otherwise transported with each other. The reformer preferably uses steam reforming (which technically need not use steam, and can use water in other forms, here typically in the form of supercritical water), and can beneficially use water captured from the engine's exhaust gas. The heat required by the reformer for the reforming process can also beneficially be supplied by the exhaust gas and/or engine heat. The reformer therefore needs no or little energy or material supply to sustain the process of reforming the hydrocarbon fuel.

Further advantages, features, and objects of the invention will be apparent from the remainder of this document in conjunction with the associated drawings.

DETAILED DESCRIPTION OF EXEMPLARY VERSIONS OF THE INVENTION

The exemplary engine/reformer systems of the aforementioned drawings will now be reviewed. Throughout the following discussion, exemplary temperatures and pressures will be noted for the various fluids used in the systems. It should be understood that these temperatures and pressures may vary depending on the choice of components used in the systems, the fuels used in the systems, ambient conditions, and similar factors.

Figure 1:
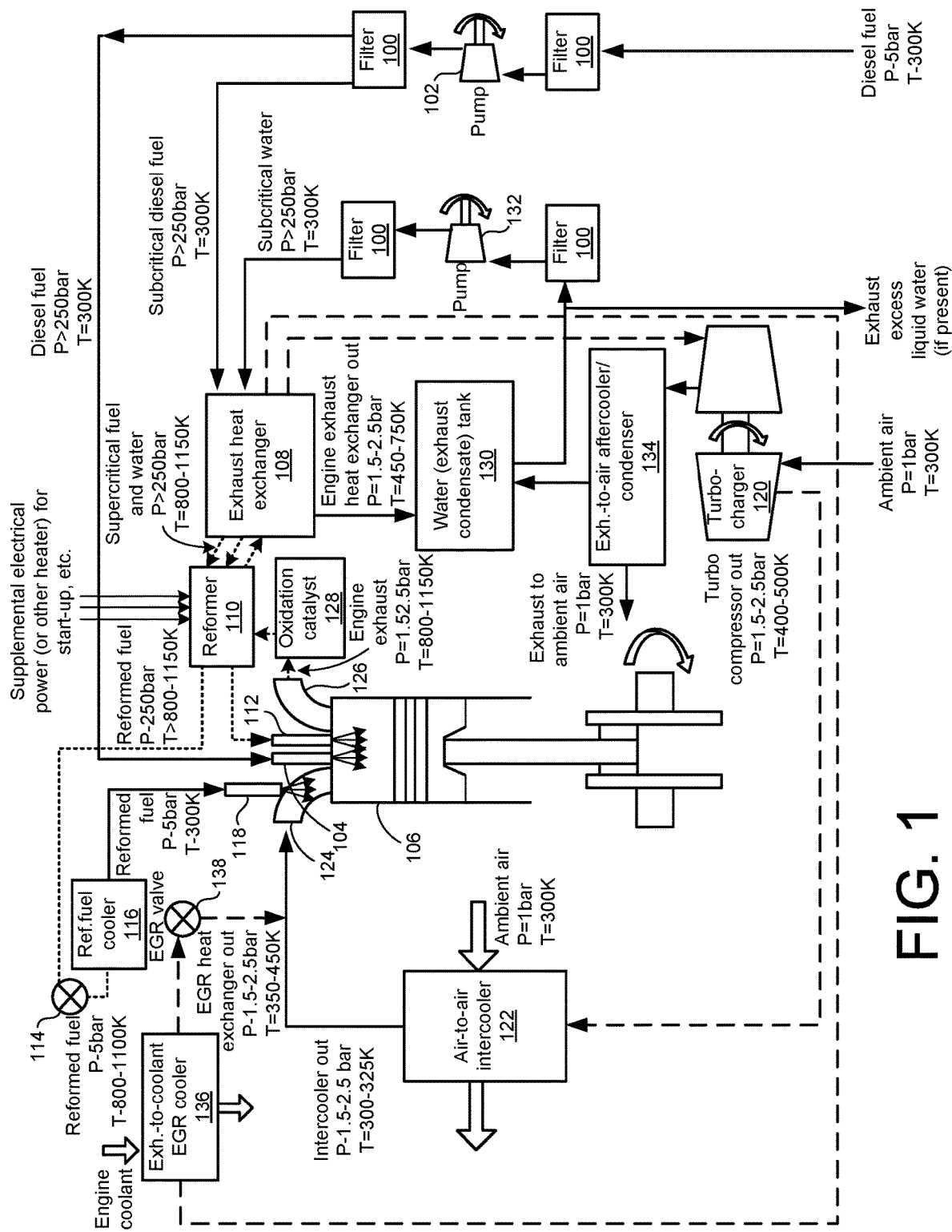
FIG. 1 is a schematic diagram of an exemplary internal combustion engine and reformer system useful for performance of RCCI combustion using only a single hydrocarbon fuel.

FIG. 1 illustrates an exemplary engine/reformer system which can be used to perform RCCI operation using only a single supplied hydrocarbon fuel (here diesel fuel, though other hydrocarbon fuels may be used instead). Looking to the bottom right of FIG. 1, diesel fuel (P=5 bar, T=300K) from a pressurized reservoir (not shown) is filtered at filter 100, and then further pressurized at pump 102 to a pressure suitable for direct injection, typically over 200 bar (here P>250 bar, T=300K). An appropriate portion of this fuel can then be supplied to a diesel injector 104 of a combustion chamber 106 for use as a first RCCI fuel, while the remaining portion can be reformed into syngas for use as a second RCCI fuel. This remaining portion of the pressurized fuel is first supplied to a heat exchanger 108 to convert the fuel to a supercritical state (P>250 bar, T=800-1150K). The supercritical fuel is then provided to a reformer 110 to generate supercritical syngas (P>250 bar, T>800-1150K) consisting of H2, CO, and other trace species. The supercritical syngas may then be provided to a syngas injector 112 for injection into the combustion chamber 106 at a time and amount suitable to create a stratified diesel/syngas mixture for RCCI combustion. Alternatively or additionally, at least some of the syngas produced in the reformer 110 can be used as a gaseous (non-supercritical) fuel, perhaps using other than RCCI combustion, at least under some speed-load conditions. Thus, as seen near the top right of FIG. 1, the supercritical syngas from the reformer 110 is throttled at valve 114 to decrease its pressure (P ~5 bar, T~800-1100K), and cooled at cooler 116 (P ~5 bar, T~300K), for supply to a port injector 118.

Now considering the system's air intake, looking near the bottom middle of FIG. 1, ambient air (P=1 bar, T=300K) is preferably pressurized by a turbocharger 120 (P=1.5-3.5 bar, T=300-600K). The air is then preferably cooled in an air-to-air intercooler/heat exchanger 122 so that its temperature is closer to ambient (P=1.5-3.5 bar, T=300-350K) prior to supply to the engine's air intake manifold 124. The turbocharger 120 may be omitted and the engine may simply be naturally aspirated, but turbocharging can usefully increase power output and efficiency.

Now considering the system's exhaust, exhaust gas (P=1.0-4.0 bar, T=500-1150K) from the exhaust manifold 126 is first preferably provided to a catalytic converter 128, where an oxidation catalyst further converts any unburned CO and hydrocarbons (if present) to carbon dioxide and water vapor. The hot exhaust is then supplied to the reformer 110 so that its heat assists the reforming process, and then in turn goes to an exhaust heat exchanger 108 to further capture "waste" heat to assist in converting the input fuel and water into the supercritical state. As the exhaust gas cools in the heat exchanger 108, condensing water vapor may be captured and collected in a tank 130 for use in the reforming process, as will be described in greater detail below. Typically, during ordinary operation of the system, the exhaust will contain more than enough water for use in the reforming process, and any excess water may simply be jettisoned to the surrounding environment. (Conversely, the water tank 130 may be "primed" with a small amount of water upon first operation of the system so that sufficient water is present to execute reforming.) The water can then be filtered at filter(s) 100, and pumped to high pressure at pump 132 to elevate it closer to the supercritical state (P>250 bar, T=300K). The exhaust heat exchanger 108 can then heat the subcritical water to the supercritical state (P>250 bar, T=800-1150K) for supply to the reformer 110 for production of the supercritical syngas.

Following removal of (at least some) water from the exhaust gas at the exhaust heat exchanger 108 (P=1.5-2.5 bar, T=450-750K), the exhaust drives the input turbine of the turbocharger 120 used to pressurize the engine's ambient air supply. After the exhaust leaves the turbocharger 120 (P=1 bar, T=400-650K), it may be further cooled in an exhaust-to-air aftercooler/condenser 134 to further condense any residual water for supply to the water tank 130. The exhaust is then released to the environment (P=1 bar, T=300K).

Because combustion is at relatively low temperature compared to traditional diesel combustion, NOx emissions are low or negligible, which beneficially allows the omission of expensive NOx exhaust after-treatment equipment. Nonetheless, if desired, at least some of the exhaust may be used for exhaust gas recirculation (EGR) for further reduction of nitrogen oxide (NOx) emissions. Looking to the exhaust heat exchanger 108, the portion of the exhaust gas which does not drive the turbocharger 120 is cooled at exhaust-to-coolant cooler 136 via heat exchange with engine coolant (P=1.5-2.5 bar, T=350-450K). The cooled exhaust gas can then be admitted to the intake manifold 124 as needed via EGR valve 138.

Beneficially, the reformer 110 can typically operate using waste exhaust/engine heat and water captured from the exhaust. At start-up or other conditions where there is low exhaust/engine temperature, heat may be provided to the reformer 110 via a supplemental (electrical or other) heater to heat the fuel and water.

Figure 2:
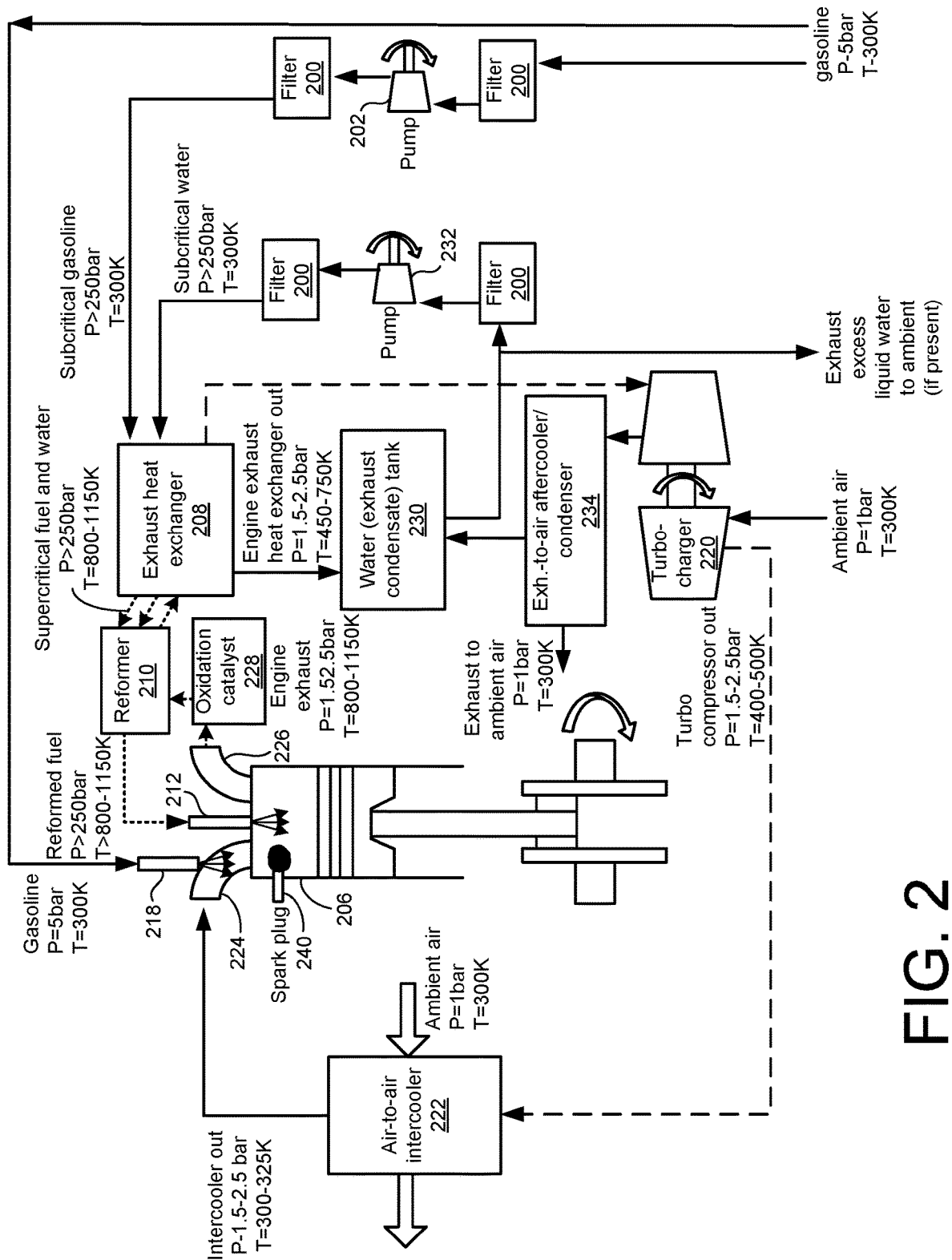
FIG. 2 is a schematic diagram of an exemplary internal combustion engine and reformer system which may operate using syngas alone or in combination with the hydrocarbon fuel from which the syngas was produced, and which may use either compression ignition or spark ignition.

FIG. 2 illustrates an exemplary engine/reformer system which can operate solely on syngas generated from a single supplied hydrocarbon fuel, and which can additionally or alternatively use the hydrocarbon fuel under at least some speed/load conditions (and which might use either compression ignition or spark ignition depending on conditions). In this example, gasoline will be considered as the hydrocarbon fuel, though other hydrocarbon fuels might be used instead (diesel fuel, jet fuel, etc.). When operating solely or primarily on syngas, the system can be operated at stoichiometric conditions without significant soot emission.

Looking to the bottom right of FIG. 2, gasoline (P=5 bar, T=300K) from a pressurized reservoir (not shown) can be provided to port injector 218 when gasoline-only operation is desired, e.g., at start-up and low load operation, and possibly during transient periods during which the engine is changing between different speed/load states. A spark plug 240 is provided on the combustion chamber 206 to enable standard spark-ignited gasoline operation.

To produce syngas for use as an alternative or additional fuel, the gasoline is filtered at filter 200, and then further pressurized at pump 202 (P>250 bar, T=300K), and heated in heat exchanger 208, to reach a supercritical state (P>250 bar, T=800-1150 K). The supercritical fuel is then provided to a reformer 210 to generate supercritical syngas (P>250 bar, T>800-1150K) consisting of H2, CO, and other trace species. The supercritical syngas may then be provided to a syngas injector 212 for injection into the combustion chamber 206, where it might be ignited via compression ignition or spark ignition, and with or without gasoline in the chamber 206, with the ignition mode and fuel(s) being chosen in accordance with speed/load conditions.

Now considering the system's air intake, looking near the bottom middle of FIG. 2, ambient air (P=1 bar, T=300K) is preferably pressurized by a turbocharger 220 (P=1.5-3.5 bar, T=300-600K). The air is then preferably cooled in an air-to-air intercooler/heat exchanger 222 so that its temperature is closer to ambient (P=1.5-3.5 bar, T=300-350K) prior to supply to the engine's air intake manifold 224. The turbocharger 220 may be omitted and the engine may simply be naturally aspirated, but turbocharging can usefully increase power output and efficiency.

Now considering the system's exhaust, exhaust gas (P=1.0-4.0 bar, T=500-1150K) from the exhaust manifold 226 is first preferably provided to a catalytic converter 228, where an oxidation catalyst further converts any unburned CO and hydrocarbons (if present) to carbon dioxide and water vapor. The hot exhaust is then supplied to the reformer 210 so that its heat assists the reforming process, and then in turn goes to an exhaust heat exchanger 208 to further capture "waste" heat to assist in converting the input fuel and water into the supercritical state. As the exhaust gas cools in the heat exchanger 208, condensing water vapor may be captured and collected in a tank 230 for use in the reforming process, as will be described in greater detail below. Typically, during ordinary operation of the system, the exhaust will contain more than enough water for use in the reforming process, and any excess water may simply be jettisoned to the surrounding environment. (Conversely, the water tank 230 may be "primed" with a small amount water upon first operation of the system so that sufficient water is present to execute reforming.) The water can then be filtered at filter(s) 200, and pumped to high pressure at pump 232 to elevate it closer to the supercritical state (P>250 bar, T=300K). The exhaust heat exchanger 208 can then heat the subcritical water to the supercritical state (P>250 bar, T=800-1150K) for supply to the reformer 210 for production of the supercritical syngas.

Following removal of (at least some) water from the exhaust gas at the exhaust heat exchanger 208 (P=1.5-2.5 bar, T=450-750K), the exhaust drives the input turbine of the turbocharger 220 used to pressurize the engine's ambient air supply. After the exhaust leaves the turbocharger 220 (P=1 bar, T=400-650K), it may be further cooled in an exhaust-to-air aftercooler/condenser 234 to further condense any residual water for supply to the water tank 230. The exhaust is then released to the environment (P=1 bar, T=300K).

The system of FIG. 2 may also be adapted to incorporate features of the system of FIG. 1. For example, the syngas might also or alternatively be provided to a port injector similar to the port injector 118 of FIG. 1 (and preferably after throttling and cooling), and the gasoline might also or alternatively be provided to a direct injector similar to the direct injector 104 for diesel fuel in FIG. 1. If desired, the system of FIG. 2 could incorporate an exhaust gas recirculation (EGR) system, as in FIG. 1. Features could instead be removed; for example, the low-pressure gasoline port injector 218 might be omitted (and spark plug 240 as well), leaving only direct injection of syngas via injector 212. In this case, the engine would operate solely on syngas using compression ignition either at lean or stoichiometric conditions. Under lean conditions it is expected that a combination of exhaust gas recirculation (EGR), as in FIG. 1, and Selective Catalytic Reduction (SCR) might be used for emissions control. Under stoichiometric conditions, a three-way catalyst (TWC) might be used for emissions control.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A combustion method for an internal combustion engine, the method including the steps of:
    a. producing syngas from hydrocarbons; and
    b. supplying the syngas to a combustion chamber of the internal combustion engine,
    c. supplying the hydrocarbons to the combustion chamber separately from the syngas,
    wherein:
        i. the step of producing syngas and the step of supplying the syngas are performed at a temperature and pressure at which the produced syngas is a supercritical fluid, and
        ii. both the syngas and the hydrocarbons are present in the combustion chamber during combustion.

2. The method of claim 1 wherein the syngas is supplied to the combustion chamber via direct injection.

3. The method of claim 1 further wherein the syngas is present in the combustion chamber at a stoichiometric air-fuel ratio during combustion.

4. The method of claim 1 wherein the hydrocarbons are supplied to the combustion chamber of the internal combustion engine after the syngas.

5. The method of claim 1 wherein the hydrocarbons and the syngas define a stratified mixture within the combustion chamber of the internal combustion engine during a compression stroke, whereby regions of higher hydrocarbon concentration are spaced from regions of higher syngas concentration.

6. The method of claim 1 wherein:
    a. the syngas is produced from the hydrocarbons in a reformer; and
    b. the method further includes the step of transferring heat to the reformer from the exhaust gas, wherein the transferred heat is the primary source of heat received by the reformer.

7. The method of claim 1 wherein:
    a. the syngas is produced from the hydrocarbons via steam reforming, and
    b. the steam reforming utilizes water captured from exhaust gas from the internal combustion engine.

8. The method of claim 1 wherein the syngas is produced from:
    a. the hydrocarbons, and
    b. water,
    wherein both the hydrocarbons and the water are in a supercritical state.

9. A combustion method for an internal combustion engine, the method including the steps of:
   a. reforming hydrocarbons to produce supercritical syngas; and
   b. supplying:
      (1) the supercritical syngas, and
      (2) the hydrocarbons separately from the supercritical syngas, to a combustion chamber of the internal combustion engine, whereby the supercritical syngas and the hydrocarbons are concurrently present in the combustion chamber.

10. The method of claim 9 wherein the supplying step includes directly injecting at least a portion of the supercritical syngas into the combustion chamber of the internal combustion engine.

11. The method of claim 9 wherein the supercritical syngas is supplied to the combustion chamber of the internal combustion engine prior to the hydrocarbons.

12. The method of claim 11 wherein the supercritical syngas and the hydrocarbons are stratified within the combustion chamber during a compression stroke, such that regions of higher syngas concentration are spaced from regions of higher hydrocarbon concentration.

13. A combustion method for an internal combustion engine, the method including the steps of:
   a. producing syngas from hydrocarbons, wherein the syngas is a supercritical fluid from production through injection; and
   b. separately and directly injecting:
      (1) the syngas, and
      (2) the hydrocarbons, into a combustion chamber of the internal combustion engine, whereby both the syngas and the hydrocarbons are present in the combustion chamber at the start of combustion.

14. The method of claim 13 wherein:
   a. the syngas is produced from the hydrocarbons in a reformer; and
   b. the method further includes the steps of:
      (1) transferring heat to the reformer from the exhaust gas, and
      (2) supplying water to the reformer from the exhaust gas.

15. The method of claim 14 wherein the hydrocarbons and the syngas define a stratified mixture within the combustion chamber of the internal combustion engine during a compression stroke, whereby regions of higher hydrocarbon concentration are spaced from regions of higher syngas concentration.

16. The method of claim 13 wherein the hydrocarbons are injected into the combustion chamber of the internal combustion engine after the syngas.

17. The method of claim 9 further wherein the syngas is present in the combustion chamber at a stoichiometric air-fuel ratio during combustion.

18. The method of claim 9 wherein:
   a. the syngas is produced from the hydrocarbons in a reformer; and
   b. the method further includes the step of transferring heat to the reformer from the exhaust gas, wherein the transferred heat is the primary source of heat received by the reformer.

19. The method of claim 9 wherein:
   a. the syngas is produced from the hydrocarbons via steam reforming, and
   b. the steam reforming utilizes water captured from exhaust gas from the internal combustion engine.

20. The method of claim 13 further wherein the syngas is present in the combustion chamber at a stoichiometric air-fuel ratio during combustion.

* * * * *